(12) United States Patent
Zhang

(10) Patent No.: US 11,884,196 B2
(45) Date of Patent: Jan. 30, 2024

(54) MULTI-FUNCTIONAL CARGO TRANSFER VEHICLE AND METHOD

(71) Applicant: Shanghai Zhishangxing Intelligent Technology Co., Ltd., Shanghai (CN)

(72) Inventor: Yuxin Zhang, Shanghai (CN)

(73) Assignee: Shanghai Zhishangxing Intelligent Technology Co., Ltd., Shanghai (CN)

( * ) Notice: Subject to any disclaimer, the term of this patent is extended or adjusted under 35 U.S.C. 154(b) by 21 days.

(21) Appl. No.: 17/481,173

(22) Filed: Sep. 21, 2021

(65) Prior Publication Data

US 2022/0001787 A1 Jan. 6, 2022

Related U.S. Application Data

(63) Continuation of application No. PCT/CN2020/078120, filed on Mar. 6, 2020.

(30) Foreign Application Priority Data

Mar. 25, 2019 (CN) .......................... 201910227953.4

(51) Int. Cl.
*B60P 1/02* (2006.01)
*B66F 7/08* (2006.01)
(Continued)

(52) U.S. Cl.
CPC .............. *B60P 1/02* (2013.01); *B66F 7/0625* (2013.01); *B66F 7/0691* (2013.01); *B66F 7/08* (2013.01);
(Continued)

(58) Field of Classification Search
CPC .. B60P 1/02; B64F 1/322; B64F 1/324; B66F 7/0625; B66F 7/0691; B66F 7/08
(Continued)

(56) References Cited

U.S. PATENT DOCUMENTS 1,573,172 A * 2/1926 Laffey ....................... B60P 1/02
414/349
2,779,487 A * 1/1957 Harris ....................... B60P 1/02
414/795.4
(Continued)

FOREIGN PATENT DOCUMENTS

CN 2463314 Y 12/2001
CN 103568918 A 2/2014
(Continued)

*Primary Examiner* — James Keenan
(74) *Attorney, Agent, or Firm* — Mei & Mark LLP; Manni Li

(57) ABSTRACT

A multi-functional cargo transfer vehicle and method. The multi-functional cargo transfer vehicle comprises a vehicle body, a cargo conveying rack, a lifting mechanism, and a control system; the vehicle body is located below for providing a platform and support; the cargo conveying rack is located above the vehicle body and includes a plurality of layers for loading and unloading cargoes; the lifting mechanism is located on the outer side of the cargo conveying rack for lifting the cargo conveying rack; the control system is located on the vehicle body for controlling omni-directional driving, accurate butt joint, and automatic loading and unloading of the multi-functional cargo transfer vehicle. Accordingly, a multi-functional cargo transfer vehicle is adopted such that the multi-task functions of loading and unloading, transporting, and conveying of cargoes are simultaneously realized, thereby efficiently completing the transferring process of cargoes from a storage place to a transporting carrier.

7 Claims, 4 Drawing Sheets

(51) Int. Cl.
*B66F 7/06* (2006.01)
*B64F 1/32* (2006.01)
*B60P 1/44* (2006.01)

(52) U.S. Cl.
CPC ............. *B60P 1/4414* (2013.01); *B64F 1/322* (2020.01); *B64F 1/324* (2020.01)

(58) Field of Classification Search
USPC ...................................................... 198/688.1
See application file for complete search history.

(56) References Cited

U.S. PATENT DOCUMENTS

| | | | | |
|---|---|---|---|---|
| 2,979,746 A | * | 4/1961 | Willsey | A01K 43/005 198/382 |
| 3,120,889 A | * | 2/1964 | Willsey | A01K 43/00 198/779 |
| 3,944,096 A | * | 3/1976 | Carder | B64F 1/322 414/345 |
| 5,630,694 A | | 5/1997 | Ihara | |
| 6,702,542 B1 | * | 3/2004 | Chance | B64F 1/324 414/495 |
| 7,857,121 B2 | * | 12/2010 | Yassour | H01L 21/67709 198/689.1 |
| 10,449,886 B2 | | 10/2019 | Richardson | |
| 2016/0368622 A1 | * | 12/2016 | Bryce | B64F 1/326 |
| 2018/0079601 A1 | | 3/2018 | Khong et al. | |

FOREIGN PATENT DOCUMENTS

| | | | | |
|---|---|---|---|---|
| CN | 104192319 A | | 12/2014 | |
| CN | 105731297 A | * | 7/2016 | ............ B66F 7/0625 |
| CN | 105800511 A | * | 7/2016 | ............ B66F 7/0625 |
| CN | 106517031 A | * | 3/2017 | ................ B66F 7/08 |
| CN | 207120684 U | | 3/2018 | |
| CN | 108557692 A | * | 9/2018 | ............ B66F 7/0625 |
| WO | WO-8001553 A1 | * | 8/1980 | ................ B60P 1/02 |

* cited by examiner

MULTI-FUNCTIONAL CARGO TRANSFER VEHICLE AND METHOD

CROSS-REFERENCE TO RELATED APPLICATIONS

The subject application is a continuation of PCT/CN2020/078120 filed on Mar. 6, 2020, which claims priority on Chinese Application No. CN201910227953.4 filed on Mar. 25, 2019 in China. The contents and subject matter of the PCT international application and Chinese priority application are incorporated herein by reference.

TECHNICAL FIELD

The invention belongs to the technical field of cargo transportation, and particularly, relates to a multi-functional cargo transfer vehicle and method applied to the loading, unloading, transportation, and transfer of cargoes at airports, stations, warehouses, freight yards, wharfs, and other places between a storage place and a transporting carrier.

BACKGROUND ART

Logistics distribution centers such as airports, stations, warehouses, freight yards, wharfs, etc., differ greatly in the manner of loading, unloading, transporting, and transferring cargoes of different sizes and weights from a storage place to a transporting carrier or from a transporting carrier to a storage place. Taking an airport as an example, the most common cargo for a passenger aircraft is the passengers' registered luggage. Generally, after an airport security check, the luggage enters an aircraft cargo space in the following process flow: (1) luggage is manually carried to the first luggage trailer and stacked up in order; (2) after the first luggage trailer is fully stacked, the luggage is carried to enter a subsequent luggage trailer; (3) the head trailer is manually driven to drag a plurality of luggage trailers filled with luggages and transports the luggages to the vicinity of the aircraft cargo space of a parking apron; (4) the luggage transferring vehicle is manually driven to align with the cargo space door of the aircraft; (5) a conveying belt is started, and luggages in the luggage trailers are manually carried to the conveying belt of the luggage transferring vehicle; (6) luggages are conveyed to the cargo space door of the aircraft by the conveying belt; and (7) luggages are manually carried from the cargo space door into the cargo space. The process flow of luggages from the aircraft cargo space to the airport luggage sorting place is the inverse of the process flow described above.

As seen from the above process flow, the circulating process of luggages or cargoes between the airport luggage sorting place and the aircraft cargo space at the parking apron requires a plurality of vehicles, including a head trailer, a luggage trailer, and a luggage transferring vehicle; multiple personnels, including a head trailer driver, luggage carrying personnel of a luggage trailer, handling personnel of a luggage transfer vehicle, and luggage carrying personnel of an aircraft cargo space; and long-circulating time, including luggage being manually carried twice for 30 minutes. The existing technology and the process flow limit the usage efficiency and cargo circulating rate of the gallery bridge of the airport, increase the labor intensity of personnel as well as the cargo transfer time, the gate position using cost, and the labor cost.

Similar problems exist in logistics distributing centers such as stations, warehouses, freight yards, wharfs, etc.

SUMMARY OF THE INVENTION

Aiming at the problems existing in the current technology, the invention provides a multi-functional cargo transfer vehicle and a method to integrate multiple vehicles with different functions, such as the three vehicles, including the luggage head trailer, the luggage trailer, and the luggage conveying vehicle of the airport, are integrated into a multi-functional cargo transfer vehicle, and meanwhile, the multi-task functions of loading and unloading, transporting, and conveying the cargo are realized. The technology may be applied to related fields to reduce the comprehensive cost of the cargo transfer process and improve the cargo transfer efficiency.

Accordingly, the invention provides the following technical solutions.

A multi-functional cargo transfer vehicle comprises a vehicle body, a cargo conveying rack, a lifting mechanism, and a control system; the vehicle body is located below for providing a platform and support; the cargo conveying rack is located above the vehicle body and comprises a plurality of layers for loading and unloading cargoes; the lifting mechanism is located on the outer side of the cargo conveying rack for lifting the cargo conveying rack; the control system is located on the vehicle body for controlling automatic loading and unloading of the cargo, omni-directional driving, and precise docking of the multi-functional cargo transfer vehicle.

Preferably, the vehicle body comprises a body, an omni-directional wheel, a battery pack, a sensor, a hydraulic pump, and a driver's stand; the omni-directional wheel is mounted at the bottom of the body for realizing functions of omni-directional driving and accurate stopping; the battery pack is mounted on the body for providing power sources for vehicle driving power and cargo conveying and lifting; the sensor is mounted at the bottom and periphery of the body for providing functions of obstacle identification, and positioning and navigation; the hydraulic pump is mounted on the body for driving the cargo conveying rack to realize lifting movement; the driver's stand is mounted at a front part of the vehicle body for manned or unmanned driving.

Preferably, the cargo conveying rack comprises a bracket, an apron board, a motor, a driving shaft, and a guide wheel; a motor, a driving shaft, and a guide wheel are mounted inside the bracket, and the driving shaft drives the guide wheel to rotate under an action of the motor to guide the cargo to move; a bottom of the bracket is connected with the lifting mechanism, and vertical and horizontal movement of the bracket is realized under the driving of the lifting mechanism; the apron board is mounted in front, rear, left, and right directions of the bracket for preventing the cargo from falling off, and a front apron board is movably connected such that when the cargo enters and exits the bracket, the front apron board is changed from a vertical state to a horizontal state, thereby facilitating cargo loading and unloading.

Preferably, the bracket is respectively provided with a left side bracket, a middle bracket, and a right side bracket along three directions of left, middle, and right of the vehicle; the motor is a control motor and comprises a stepping motor, a servo motor, and a variable frequency motor, and is used for realizing programming control of a movement state; the driving shaft is connected with the motor through a speed reducer and is connected with the guide wheel through a key; the guide wheel is of a circular truncated cone structure with two small ends and a large middle, and a surface thereof is provided with an anti-slip stripe.

Preferably, the cargo conveying rack comprises a multi-layer bracket for arranging a plurality of cargoes; the left side bracket of each layer of the bracket is provided with two columns of cargo conveying grooves with horizontal inclination angles of 3° to 10° and −3° to −10°, the middle bracket is provided with a cargo conveying groove with a horizontal inclination angle of 0°, and the right side bracket is provided with two columns of cargo conveying grooves with horizontal inclination angles of 3° to 10° and −3° to −10°.

Preferably, the lifting mechanism comprises a multi-layer lifting unit, and the number of layers of the lifting unit is matched with the number of layers of the cargo conveying rack; each layer of lifting unit comprises a connecting rod, a positioning pin, and a hydraulic cylinder, wherein a plurality of connecting rods are connected together through the positioning pin, and the hydraulic cylinder is mounted between the bracket and the connecting rod; starting from a bottom-layer lifting unit, in supporting points at two ends of each layer of lifting unit, one end is connected with a same-layer bracket, and the other end is connected with a previous-layer bracket; in supporting points at two ends of the top-layer lifting unit, one end is connected with the top-layer bracket, and the other end is connected with a body.

Preferably, the control system comprises a main control board, an automatic driving module, a navigation module, an electro-hydraulic control module, and a movement control module; the automatic driving module, the navigation module, the electro-hydraulic control module, and the movement control module are respectively electrically connected with the main control board to control different functions; the automatic driving module and the navigation module are used for realizing omni-directional driving control, braking control, positioning control, and path navigation of the multi-functional cargo transfer vehicle; the electro-hydraulic control module is used for realizing lifting control of the lifting mechanism; the movement control module is used for controlling the movement of the multi-functional cargo transfer vehicle and cargo loading and unloading.

A method for cargo transfer by a multi-functional cargo transfer vehicle, where the multi-functional cargo transfer vehicle integrates a plurality of vehicles with different functions into one vehicle and simultaneously realizes multi-task functions of loading and unloading, transporting, and conveying cargoes, thereby efficiently completing a transferring process of cargoes between a storage place and a transporting carrier; cargoes in different columns move smoothly in a loading and unloading process, wherein a multilayer cargo bracket is comprised for stacking when no cargo exists and unfolding when cargoes exist; the multi-layer lifting unit is independently controlled, hoisted and lifted; the lifting device is hydraulic, pneumatic, electrically driven or a combination of the three; the control system and the omni-directional wheel driven multi-functional cargo transfer vehicle realizes forward movement, backward movement, left movement, right movement, making a turn, turning around, and other movements, and autonomous navigation and automatic driving in a small-range field.

Preferably, under the action of the control system, the lifting mechanism transports the cargo from the multi-functional cargo transfer vehicle to the transporting carrier; firstly, the top-layer bracket ascends or descends to a transporting carrier cabin door, the cargo enters the transporting carrier, and after unloading, the top-layer bracket ascends and is higher than the transporting carrier cabin door; secondly, the middle-layer bracket ascends to the transporting carrier cabin door, the cargo enters the transporting carrier, and after unloading, the middle-layer bracket ascends and is higher than the transporting carrier cabin door and is stacked together with the top-layer bracket; then, the bottom-layer bracket ascends to the transporting carrier cabin door, the cargo enters the transporting carrier, and after unloading, the bottom-layer bracket descends to the body; finally, the middle-layer bracket descends and is stacked on the bottom-layer bracket, and the top-layer bracket descends and is stacked on the middle-layer bracket.

Preferably, under the action of the control system, the lifting mechanism transfers the cargo from the transporting carrier to the multi-functional cargo transfer vehicle; firstly, a three-layer bracket stacked together ascends, the top-layer bracket and the middle-layer bracket are higher than a transporting carrier cabin door, and the bottom-layer bracket reaches the transporting carrier cabin door; secondly, the cargo enters the bottom-layer bracket, and after loading, the bottom-layer bracket descends to the body; then, the middle-layer bracket descends to the transporting carrier cabin door, the cargo enters the middle-layer bracket, and after loading, the middle-layer bracket descends to a position above the bottom-layer bracket fully loaded with the cargo; finally, the top-layer bracket descends to the transporting carrier door, the cargo enters the top-layer bracket, and after loading, the top-layer bracket descends to a position above the middle-layer bracket fully loaded with the cargo.

Compared with the existing technology, the invention has beneficial effects as follows.

(1) A plurality of vehicles with different functions is integrated into a multi-functional vehicle, efficiently completing the transferring process of the cargo from a storage place to a transporting carrier and simultaneously realizing the multi-task functions of loading and unloading, transporting, and conveying the cargo.

(2) The cargo transfer efficiency is improved, the cargo transfer cost is reduced, and the cargo throughput, economic benefits, and social benefits of a logistics distributing center are directly improved.

(3) The invenion may be widely adpoted in the areas of logistics distributing centers, such as airports, stations, warehouses, freight yards, wharfs, etc.

(4) The degree of automation is high, and it is easy to use.

Figure 1:
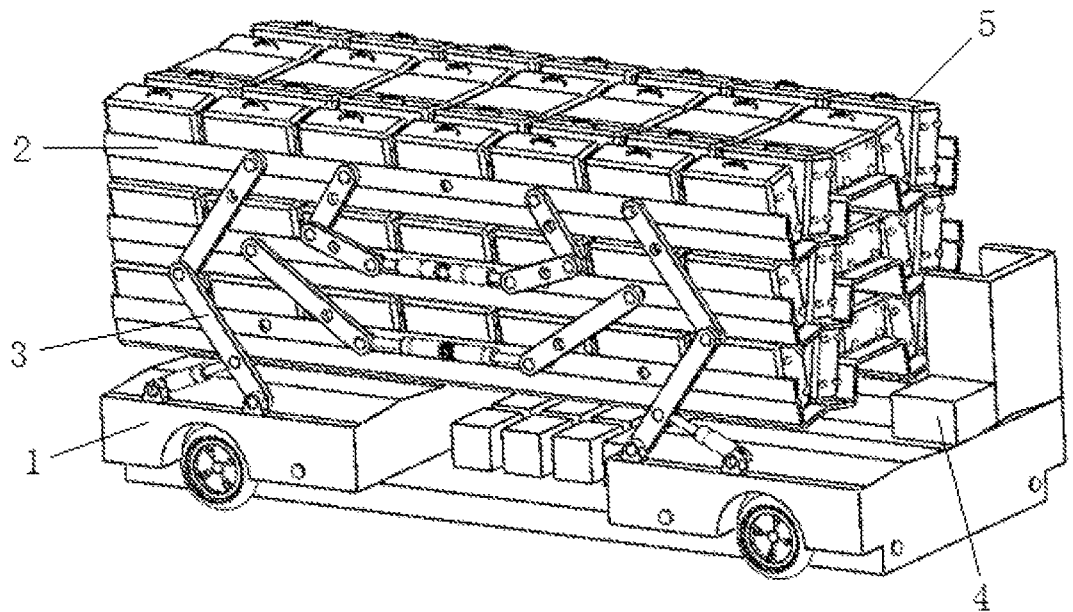
FIG. 1 shows the structure of the multi-functional cargo transfer vehicle in one embodiment of the present invention.

The reference numerals are used as follows: 1—vehicle body; 2—cargo conveying rack; 3—lifting mechanism; 4—control system; 5—cargo; 11—body; 12—omni-directional wheel; 13—battery pack; 14—sensor; 15—hydraulic pump; 16—driver's stand; 21—bracket; 22—apron board; 23—motor; 24—driving shaft; 25—guide wheel; 201—bottom-layer bracket; 202—middle-layer bracket; 203—top-layer bracket; 211—left side bracket; 212—middle bracket; 213—right side bracket; 301—bottom-layer lifting unit; 302—middle-layer lifting unit; 303—top-layer lifting unit; 311—connecting rod; 312—positioning pin; 313—hydraulic cylinder; 41—main control board; 42—automatic driving module; 43—navigation module; 44—electro-hydraulic control module; 45—movement control module; 46—speed reducer; 47—key, and 48—anti-slip stripe.

DETAILED DESCRIPTION OF THE INVENTION

The present invention is described in detail with reference to the accompanying drawings and specific embodiment. The specific embodiment and description are intended to illustrate, but not to limit, the present invention.

Embodiment

The multi-functional cargo transfer vehicle as shown in FIG. 1, comprising a vehicle body 1, a cargo conveying rack 2, a lifting mechanism 3, and a control system 4. The front part of the vehicle body 1 is provided with a driver's stand 16, the upper part of the vehicle body 1 is provided with a multilayer cargo conveying racks 2, the outer side of the cargo conveying rack 2 is provided with a lifting mechanism 3, and the cargo 5 is located on the cargo conveying rack 2; the control system 4 helps to achieve precise docking of the multi-functional cargo transfer vehicle and the cargo shelf or precise docking of the multi-functional cargo transfer vehicle and the transporting carrier cargo, and automatic cargo loading and unloading of the multilayer cargo conveying rack 2 and the lifting mechanism 3.

Figure 2:
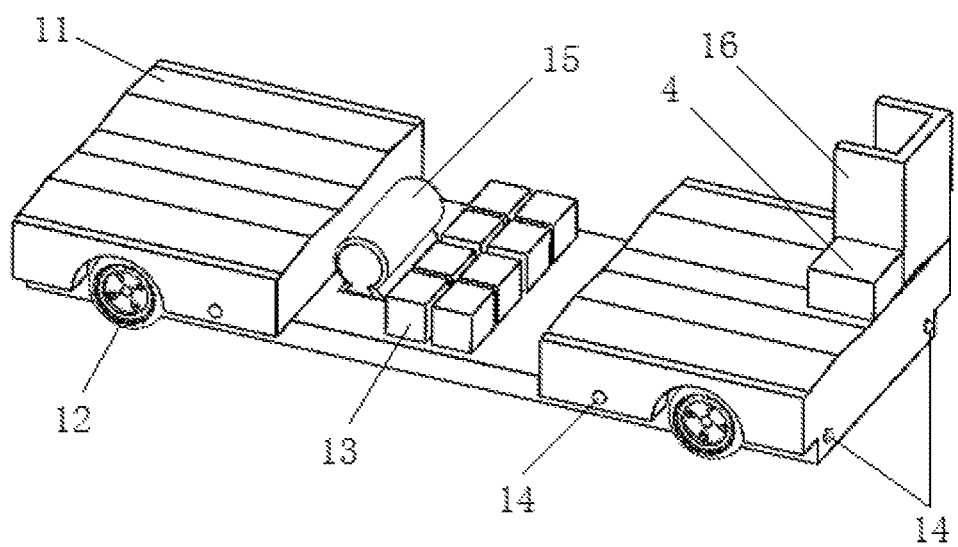
FIG. 2 shows the structure of the vehicle body of a multi-functional cargo transfer vehicle in the embodiment of the present invention.

As shown in FIG. 2, vehicle body 1 comprises a body 11, an omni-directional wheel 12, a battery pack 13, sensors 14, a hydraulic pump 15, and a driver's stand 16; the omni-directional wheel 12 is mounted at the bottom of the body 11 to realize the functions of omni-directional driving and accurate positioning; the battery pack 13 is mounted on the body and provides the power source for the driving power of the vehicle body 1, and the conveyance and lifting of the cargo conveying rack 2; sensors 14 are mounted at the bottom and the periphery of the body 11 and provide functions of obstacle identification, positioning, and navigation; the hydraulic pump 15 is mounted on the body 1 and drives the cargo conveying rack 2 to realize lifting movement; the driver's stand 16 is mounted at the front part of the vehicle body 1, and is manned or unmanned.

Figure 3:
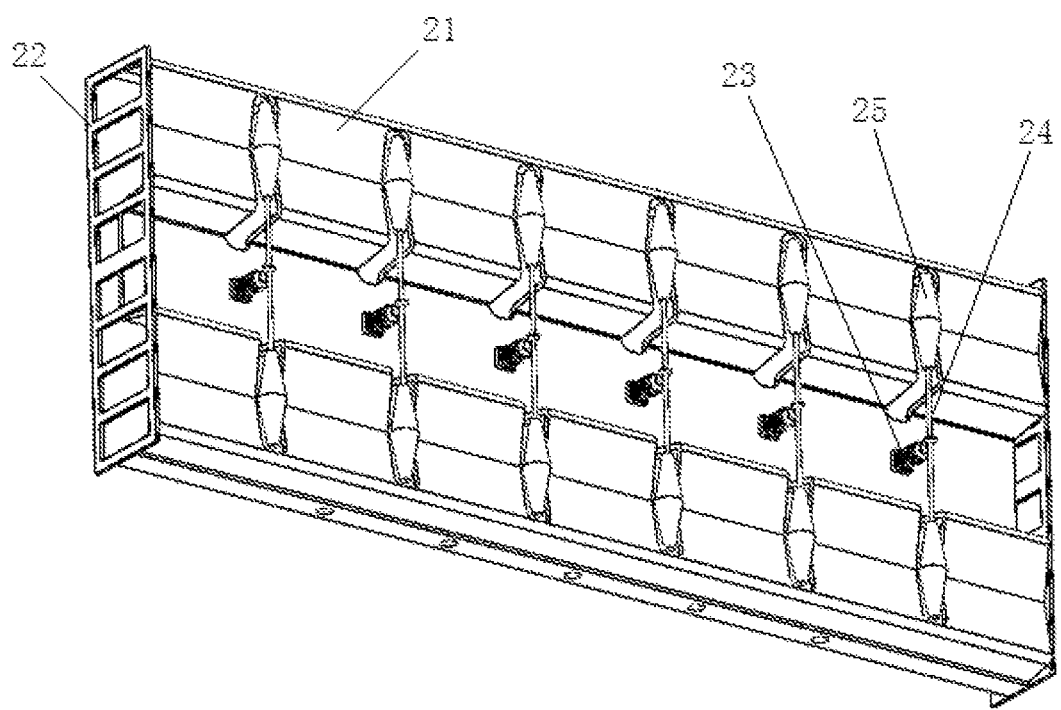
FIG. 3 shows the structure of the bottom of the cargo conveying rack of the multi-functional cargo transfer vehicle in the embodiment of the present invention.
Figure 4:
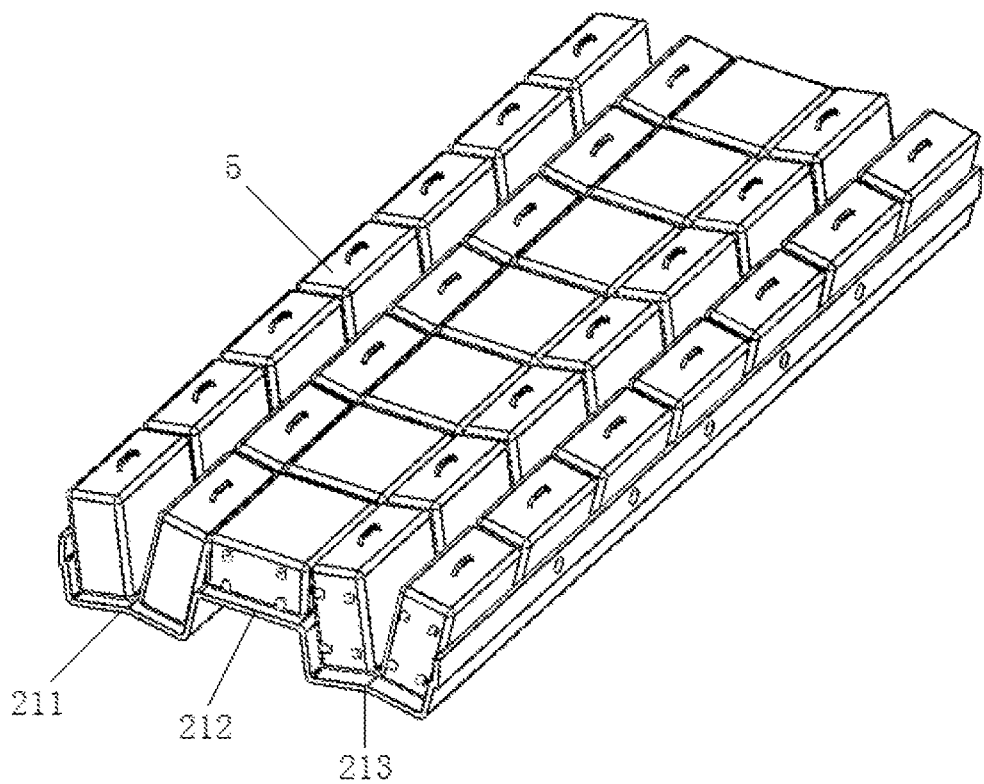
FIG. 4 shows the structure of the upper part of the cargo conveying rack of the multi-functional cargo transfer vehicle in the embodiment of the present invention.

As shown in FIGS. 3 and 4, the cargo conveying rack 2 comprises a bracket 21, an apron board 22, a motor 23, a driving shaft 24, and a guide wheel 25; the bracket 21 is provided with a left side bracket 211, a middle bracket 212 and a right side bracket 213, and the cargoes 5 are respectively placed on the bracket 21; the left side bracket 211 has two columns of cargo conveying grooves with horizontal inclination angles of 3° to 10° and −3° to −10°, the middle bracket 212 has a cargo conveying groove with a horizontal inclination angle of 0°, and the right side bracket 213 has two columns of cargo conveying grooves with horizontal inclination angles of 3° to 10° and −3° to −10°; a motor 23, a driving shaft 24 and a guide wheel 25 are mounted inside the bracket 21; the bottom of the bracket 21 is connected with the lifting mechanism 3; the apron board 22 is mounted in the front, rear, left, and right directions of the bracket; the motor 23 is connected with a driving shaft 24 and a guide wheel 25, and the guide wheel 25 is of a spindle-shaped structure and has an anti-slip stripe on the surface.

As an optional design, the cargo conveying rack 2 is provided with three-layer bracket 21, respectively a bottom-layer bracket 201, a middle-layer bracket 202, and a top-layer bracket 203, capable of arranging 105 pieces of 28-inch standard luggages.

Figure 5:
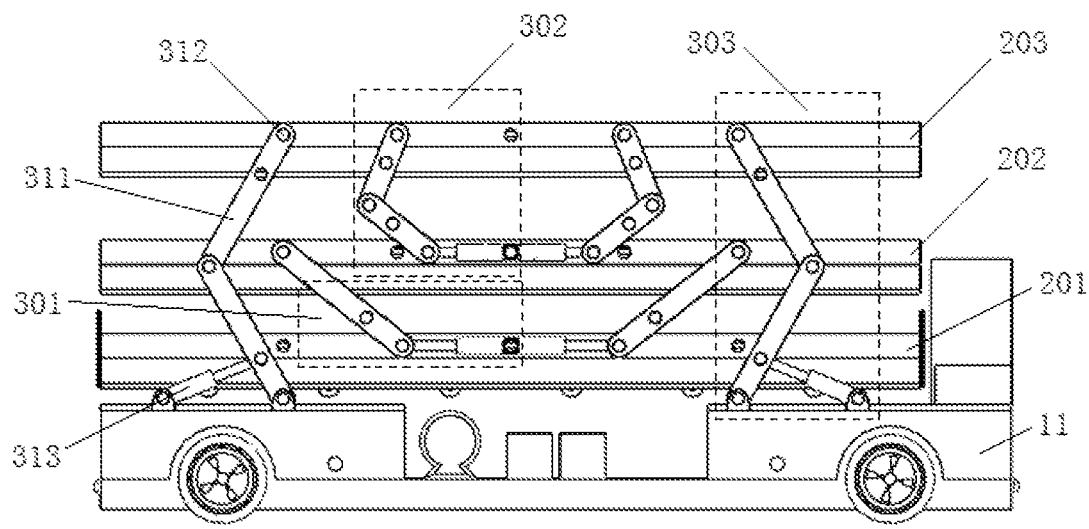
FIG. 5 shows the structure of the lifting mechanism of the [ ] multi-functional cargo transfer vehicle in the embodiment of the present invention.

As shown in FIG. 5, the lifting mechanism 3 comprises a plurality of lifting units, and it comprises 3 lifting units as shown in the figure, including a bottom-layer lifting unit 301, a middle-layer lifting unit 302, and a top-layer lifting unit 303; each layer of the lifting units includes a connecting rod 311, a positioning pin 312, and a hydraulic cylinder 313, a plurality of connecting rods 311 being connected together through the positioning pin 312, and the hydraulic cylinder 313 being mounted between the bracket 21 and the connecting rod 311; in supporting points at two ends of the bottom-layer lifting unit 301, one end is connected with the bottom-layer bracket 201, and the other end is connected with the middle-layer bracket 202; in supporting points at two ends of the middle-layer lifting unit 302, one end is connected with the middle-layer bracket 202, and the other end is connected with the top-layer bracket 203; in supporting points at two ends of the top-layer lifting unit 303, one end is connected with the top-layer bracket 203, and the other end is connected with the body 11.

Figure 6:
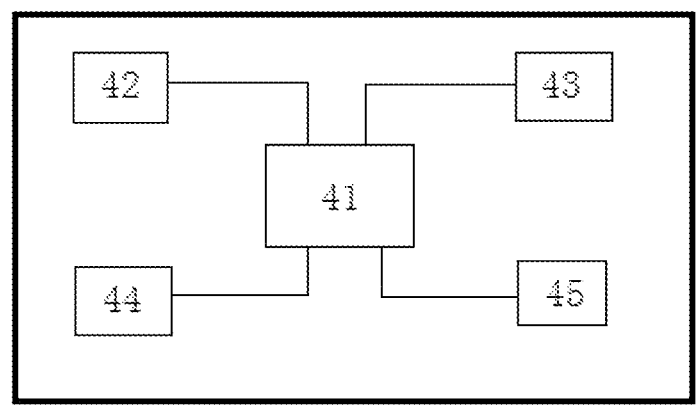
FIG. 6 shows the structure of the control system of the multi-functional cargo transfer vehicle in the embodiment of the present invention.

As shown in FIG. 6, the control system 4 comprises a main control board 41, an automatic driving module 42, a navigation module 43, an electro-hydraulic control module 44, and a movement control module 45; the control system 4 is mounted on the vehicle body 1, and the automatic driving module 42, the navigation module 43, the electro-hydraulic control module 44 and the movement control module 45 are respectively and electrically connected with the main control board 41 to complete the control of different functions; the automatic driving module 42 and the navigation module 43 are connected with the driver's stand 16 to realize starting and stopping control, braking control, positioning control, path navigation and driving control of the multi-functional cargo transfer vehicle; the electro-hydraulic control module 44 is electrically connected with the hydraulic pump 15 and the lifting unit to realize lifting control of the programmable multilayer lifting unit; the movement control module 45 is electrically connected with the motor 23 to allow cargoes to be loaded and unloaded from each layer of the bracket 21 to a transporting carrier or cargo storage place under the combined action of the motor 23, the driving shaft 24, and the guide wheel 25; the ascending or descending of each layer of the bracket 21 is controlled to realize the cargo loading and unloading control of the multilayer bracket 21.

The process flow for loading and transporting cargoes by the multi-functional cargo transfer vehicle at airport luggage sorting place is as follows: firstly, the cargo enters a conveying groove with a horizontal inclination angle of 3° to 10° of a left side bracket 211 of a top-layer bracket 203 until the cargoes are full, and the cargoes lean to the left; secondly, the cargoes enter a conveying groove with a horizontal inclination angle of −3° to −10° of the left side bracket 211 until the cargoes are full, and the cargoes lean to the right; thirdly, the cargoes enter the cargo conveying groove with the horizontal inclination angle of 0° of the middle bracket 212 until the cargoes are full; the cargoes are re-driven to enter the cargo conveying groove with horizontal inclination angles of −3° to −10° and 3° to 10° of the right side bracket 213 until the cargoes are full, and the cargoes lean to the right and left, respectively. Lifting the fully loaded top-layer bracket 203, similarly, the cargoes enter the empty middle-layer bracket 202 until the cargoes are full; lifting the fully loaded middle-layer bracket 202, similarly, cargoes enter the empty bottom-layer bracket 201 until the cargoes are full.

The multi-functional cargo transfer vehicle fully loaded with cargoes carries cargoes from airport luggage sorting place, runs to an aircraft cargo space of a parking apron, and unloads cargoes. The process flow is as follows: firstly, the loaded top-layer bracket 203 is aligned with a cargo space door of an aircraft, the motor 23 drives the driving shaft 24 and the guide wheel 25 to push the cargo into the aircraft cargo space, and the unloaded top-layer bracket 203 ascends and is higher than the cargo space door of the aircraft; secondly, the loaded middle-layer bracket 202 ascends to the cargo space door of the aircraft, the motor 23 drives the driving shaft 24 and the guide wheel 25 to push the cargo into the aircraft cargo space, and the unloaded middle-layer bracket 202 ascends and is higher than the cargo space door of the aircraft, and is stacked together with the top-layer bracket 203; then, the loaded bottom-layer bracket 201 ascends to the cargo space door of the aircraft, the motor 23 drives the driving shaft 24 and the guide wheel 25 to push the cargo into the aircraft cargo space, and the unloaded bottom-layer bracket 201 descends to the body 11; finally, the middle-layer bracket 202 descends and is stacked on the bottom-layer bracket 201, and the top-layer bracket 203 descends and is stacked on the middle-layer bracket 202.

As an optional design, the loading process flow for the multi-functional cargo transfer vehicle with the three-layer cargo bracket 21 from an empty vehicle to drive to an aircraft cargo space door of a parking apron is as follows: firstly, the top-layer bracket 203 and the middle-layer bracket 202 ascend and are higher than the cargo space door of the airplane; secondly, the bottom-layer bracket 201 is aligned with the cargo space door of the airplane, the motor 23 drives the driving shaft 24 and the guide wheel 25 to push the cargo from the aircraft cargo space to enter the bottom-layer bracket 201, and the bottom-layer bracket 201 fully loaded with cargoes descends to the body 11; thirdly, the middle-layer bracket 202 descends to align with the cargo space door of the airplane, the motor 23 drives the driving shaft 24 and the guide wheel 25 to push the cargo from the airplane cargo space to enter the middle-layer bracket 202, and the middle-layer bracket 202 fully loaded with cargoes descends above the bottom-layer bracket 201; finally, the top-layer bracket 203 descends to be aligned with the cargo space door of the airplane, and the motor 23 drives the driving shaft 24 and the guide wheel 25 to push the cargo from the aircraft cargo space to enter the top-layer bracket 203 until cargoes are full.

The unloading process flow for the multi-functional cargo transfer vehicle fully loaded with cargoes which carries and transports cargoes from the aircraft cargo space of the parking apron and runs to the airport luggage sorting place is as follows: firstly, the loaded bottom-layer bracket 201 is aligned with the airport luggage sorting machine, the motor 23 drives the driving shaft 24 and the guide wheel 25 to push the cargo to enter the sorting machine, and the unloaded bottom-layer bracket 201 descends to the body 11; secondly, the loaded middle-layer bracket 202 is aligned with the airport luggage sorting machine, the motor 23 drives the driving shaft 24 and the guide wheel 25 to push the cargo to enter the sorting machine, and the unloaded middle-layer bracket 202 descends above the bottom-layer bracket 201; finally, the loaded top-layer bracket 203 is aligned with the airport luggage sorting machine, the motor 23 drives the driving shaft 24 and the guide wheel 25 to push the cargo to enter the sorting machine, and the unloaded top-layer bracket 203 descends above the middle-layer bracket 202.

The above descriptions are only preferred embodiments of the present invention and do not limit the present invention. Any modification, equivalent replacement, and improvement made within the spirit and principle scope of the present invention shall be included in the scope of the present invention.

I claim:
1. A multi-functional cargo transfer vehicle, comprising
a vehicle body (1),
a cargo conveying rack (2),
a lifting mechanism (3), and
a control system (4),
wherein the vehicle body (1) is located at a lower part of the multi-functional cargo transfer vehicle and provides a platform to support the cargo conveying rack (2), the lifting mechanism (3), and the control system (4);
the cargo conveying rack (2) is located above the vehicle body (1) and comprises a plurality of layers for loading and unloading cargos;
the lifting mechanism (3) is for lifting the cargo conveying rack (2);
the control system (4) is located on the vehicle body (1) for controlling automatic loading and unloading of the cargos, omni-directional driving, and precise docking of the multi-functional cargo transfer vehicle;
the cargo conveying rack (2) comprises brackets (21), apron boards (22), and a plurality of corresponding motors (23), driving shafts (24), and guide wheels (25), wherein the motors (23), the driving shafts (24), and the guide wheels (25) are mounted inside the brackets (21), and the driving shafts (24) are respectively connected with the corresponding motors (23) through speed reducers (46) and with the corresponding guide wheels (25) through keys (47), the motors (23) are adapted to control movement of the cargos in and out of the brackets (21) through the corresponding driving shafts (24) and the guide wheels (25) as the driving shafts (24) drive the corresponding guide wheels (25) to rotate under an action of the corresponding motors (23) to move the cargos on the brackets;
the brackets (21) are multi-layered for arranging a plurality of cargoes and comprise a left side bracket (211), a middle bracket (212), and a right side bracket (213) on each layer lengthwise along the vehicle, a bottom of the brackets (21) is connected with the lifting mechanism (3), the brackets (21) are driven by the lifting mechanism (3) to move vertically, the left side bracket (211) is provided with two columns of cargo conveying grooves with horizontal inclination angles of 3° to 10° and −3° to −10°, the middle bracket (212) is provided with a cargo conveying groove with a horizontal inclination angle of 0°, and the right side bracket (213) is provided with two columns of cargo conveying grooves with the horizontal inclination angles of 3° to 10° and −3° to −10°; and
the apron boards (22) are mounted in front, rear, left, and right sides of the brackets (21) for preventing the cargo from falling off.

2. The multi-functional cargo transfer vehicle according to claim 1, wherein each of the guide wheels (25) is of a circular truncated cone structure with two tapering ends and a wide middle section, and comprises a surface with an anti-slip stripe (48).

3. The multi-functional cargo transfer vehicle according to claim 1, wherein the lifting mechanism (3) comprises a multi-layer lifting unit, and the number of layers in the multi-layer lifting unit is matched with the number of layers of the cargo conveying rack (2);

each layer of lifting unit comprises a plurality of connecting rods (311), positioning pins (312), and a hydraulic cylinder (313), wherein the plurality of connecting rods (311) are connecting together through the positioning pins (312), and the hydraulic cylinder (313) is mounted between the brackets (21) and the connecting rods (311);

a lifting unit at a bottom layer comprises a first end and a second end for support, the first end is connected with one of the brackets (21) at the bottom layer, and the second end is connected with another one of the brackets (21) at a layer immediately above the bottom layer; and a lifting unit at a top layer has a third end and a fourth end for support, the third end is connected with one of the brackets (21) at the top layer, and the fourth end is connected with the vehicle body at the lower part of the multi-functional cargo transfer vehicle (11).

4. The multi-functional cargo transfer vehicle according to claim 1, wherein the vehicle body (1) comprises a body (11), an omni-directional wheel (12), a battery pack (13), a sensor (14), a hydraulic pump (15), and a driver's stand (16);

the omni-directional wheel (12) is mounted at the bottom of the body (11) for realizing functions of omni-directional driving and accurate stopping;

the battery pack (13) is mounted on the body (11) for providing power sources for vehicle driving power and cargo conveying and lifting;

the sensor (14) is mounted at the bottom and periphery of the body (11) for providing functions of obstacle identification, and positioning and navigation;

the hydraulic pump (15) is mounted on the body (11) for driving the cargo conveying rack (2) to realize lifting movement; and the driver's stand (16) is mounted at a front part of the vehicle body (1) for manned or unmanned driving.

5. The multi-functional cargo transfer vehicle according to claim 1, wherein the lifting mechanism (3) is located on an outer side of the cargo conveying rack (2).

6. The multi-functional cargo transfer vehicle according to claim 1, wherein the control system (4) comprises a main control board (41), an automatic driving module (42), a navigation module (43), an electro-hydraulic control module (44), and a movement control module (45);

the automatic driving module (42), the navigation module (43), the electro-hydraulic control module (44), and the movement control module (45) are respectively electrically connected with the main control board (41) to complete control of different functions;

the automatic driving module (42) and the navigation module (43) are for realizing omni-directional driving control, braking control, positioning control and path navigation of the multi-functional cargo transfer vehicle;

the electro-hydraulic control module (44) is for realizing lifting control of the lifting mechanism (3); and the movement control module (45) is used for controlling the movement of the multi-functional cargo transfer vehicle and cargo loading and unloading.

7. A method of using the multi-functional cargo transfer vehicle of claim 1, comprising proividing the multi-functional cargo transfer vehicle of claim 1, and loading, unloading, transporting, and conveying cargoes by the multi-functional cargo transfer vehicle.

\* \* \* \* \*